US008913074B2

(12) United States Patent
Levin et al.

(10) Patent No.: US 8,913,074 B2
(45) Date of Patent: Dec. 16, 2014

(54) COLORIZATION METHOD AND APPARATUS

(75) Inventors: Anat Levin, Jerusalem (IL); Dani Lischinski, Jerusalem (IL); Yair Weiss, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 2237 days.

(21) Appl. No.: 11/579,754

(22) PCT Filed: May 5, 2005

(86) PCT No.: PCT/IL2005/000479
§ 371 (c)(1),
(2), (4) Date: Dec. 9, 2009

(87) PCT Pub. No.: WO2005/104662
PCT Pub. Date: Nov. 10, 2005

(65) Prior Publication Data
US 2010/0085372 A1    Apr. 8, 2010

Related U.S. Application Data

(60) Provisional application No. 60/568,578, filed on May 5, 2004.

(51) Int. Cl.
*G09G 5/02* (2006.01)
*G06T 11/00* (2006.01)
*H04N 9/43* (2006.01)

(52) U.S. Cl.
CPC ............... *H04N 9/43* (2013.01); *G06T 11/001* (2013.01)
USPC ............................. 345/589; 345/690; 345/619

(58) Field of Classification Search
CPC ............................. B44D 3/003; G09G 5/02
USPC ............................. 345/589, 690, 619
See application file for complete search history.

(56) References Cited

U.S. PATENT DOCUMENTS

| 5,050,984 | A | * | 9/1991 | Geshwind | 352/38 |
|---|---|---|---|---|---|
| 5,473,739 | A | * | 12/1995 | Hsu | 345/619 |
| 5,743,266 | A | * | 4/1998 | Levene et al. | 600/458 |
| 5,831,633 | A | * | 11/1998 | Van Roy | 345/441 |

(Continued)

FOREIGN PATENT DOCUMENTS

| CA | 1291260 | 10/1991 |
|---|---|---|
| WO | WO 2005/104662 | 10/2005 |

OTHER PUBLICATIONS

P. Perez, Poisson Image Editing, Microsoft Researchxeds.eu/clone/poisson.—2003.*
]Transferring Color to Greyscale Images—T Welsh—2002.*

(Continued)

*Primary Examiner* — Javid A Amini

(57) ABSTRACT

A method for colorization of images is presented. The method comprises the following steps: Displaying an image (102); applying multiple color markings (at least two colors are different) to the displayed image (104); automatically coloring the image by applying a constrained optimization to a cost function that is responsive to the marked colors and the intensity differences of the neighborhoods of some of all of the pixels (106); the resultant image is subsequently stored (110), displayed (108), or transferred (112).

44 Claims, 13 Drawing Sheets
(10 of 13 Drawing Sheet(s) Filed in Color)

(56) References Cited

U.S. PATENT DOCUMENTS

| | | | |
|---|---|---|---|
| 7,142,693 B2* | 11/2006 | Zhang et al. | 382/100 |
| 7,263,207 B2* | 8/2007 | Lee et al. | 382/103 |
| 2002/0154695 A1* | 10/2002 | Cornog et al. | 375/240.16 |
| 2003/0059090 A1* | 3/2003 | Zhang et al. | 382/110 |
| 2003/0113003 A1* | 6/2003 | Cline et al. | 382/128 |
| 2003/0185434 A1* | 10/2003 | Lee et al. | 382/154 |
| 2003/0194119 A1* | 10/2003 | Manjeshwar et al. | 382/131 |
| 2003/0215134 A1* | 11/2003 | Krumm | 382/170 |
| 2005/0256399 A1* | 11/2005 | Sirohey et al. | 600/425 |

OTHER PUBLICATIONS

Bertalmio et al. "Image Inpainting", Proceedings of the 27th Conference on Computer Graphics and Interactive Techniques, p. 417-424, 2000.

Horiuchi "Estimation of Color for Gray-Level Image by Probabilistic Relaxation", Proceedings of the 16th International Conference on Pattern Recognition, 3: 867-870, 2002.

Horiuchi et al. "Colorization Algorithm for Grayscale Image by Propagating Seed Pixels", Proceedings of the 2003 International Conference on Image Processing, p. 457-460, 2003.

Lucas et al. "An Iterative Image Registration Technique With an Application to Stereo Vision". Int. Joint Conf. AI (1981) pp. 674-670.

Perona et al. "Scale-Space and Edge Detection Using Anisotropic Diffusion" IEEE Trans. on PAMI, vol. 8 (5): p. 565-593, 1989.

Tang et al. "Color Image Enhancement Via Chromaticity Diffusion", IEEE Transactions on Image Processing, vol. 15 (5): p. 701-708, 2001.

* cited by examiner

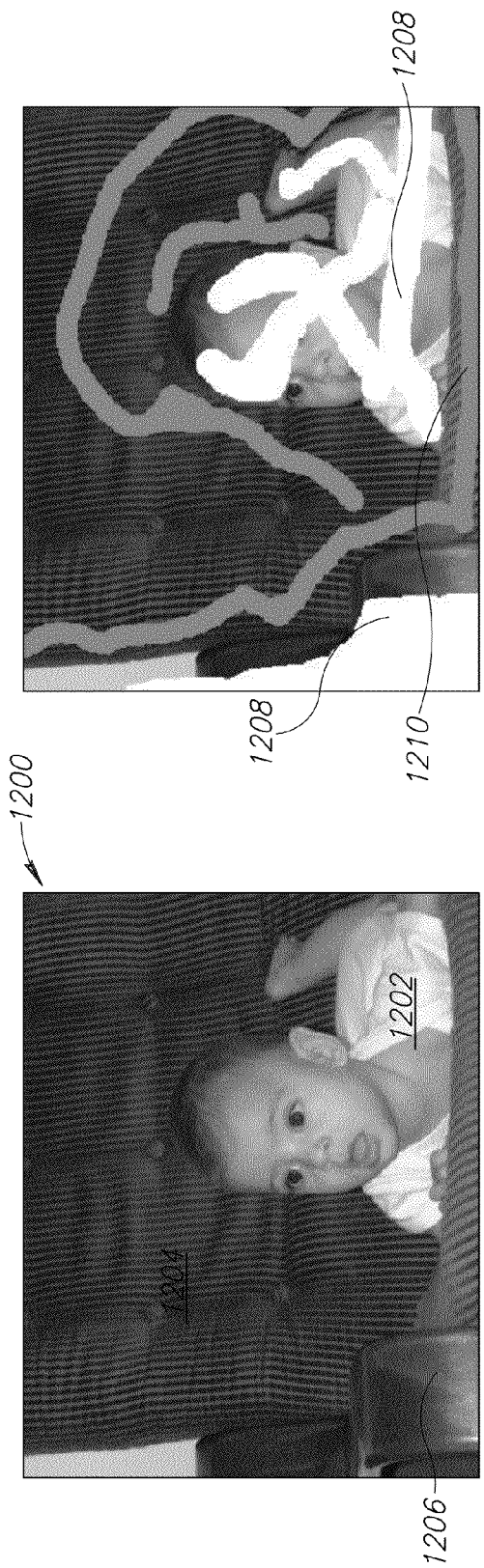
FIG.12A
FIG.12B
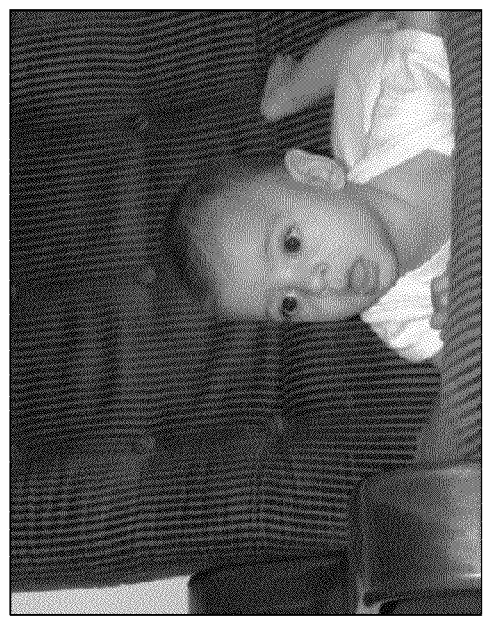
FIG.12C

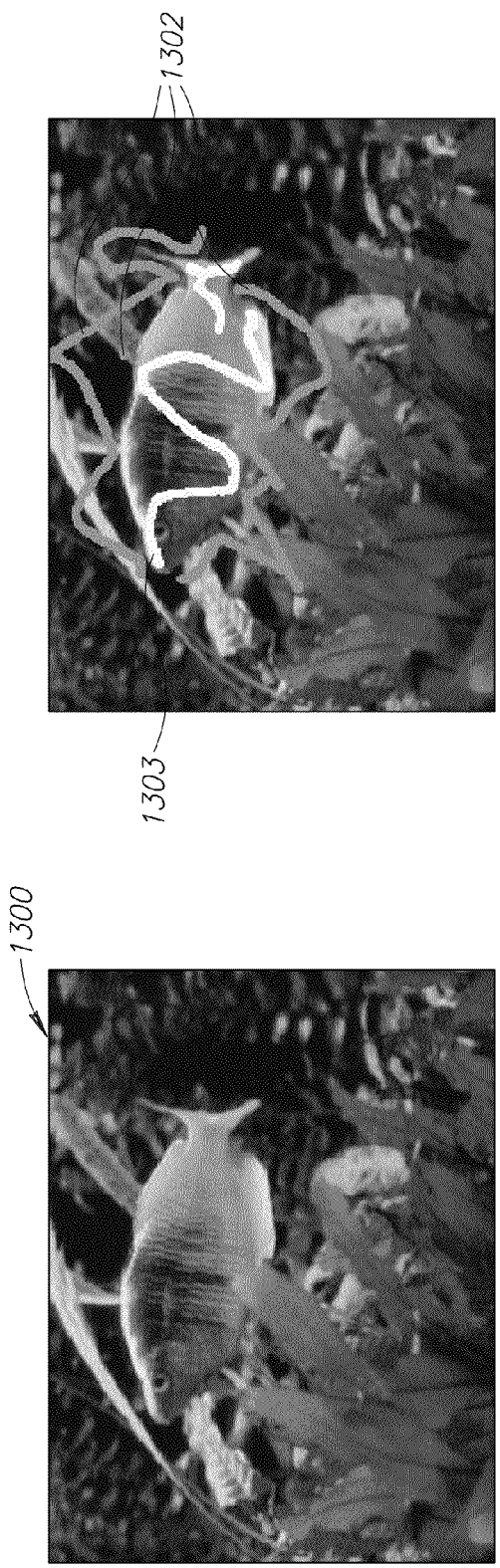
FIG.13A
FIG.13B
FIG.13C

COLORIZATION METHOD AND APPARATUS

RELATED APPLICATIONS AND SOURCES FOR COLOR PHOTOGRAPHS

The present application is a U.S. National Phase of PCT Application No. PCT/IL20051000479, filed on May 5. 2005. This application also claims the benefit under 35 U.S.C. 119 (e) of provisional patent application Ser. No. 60/568,578, filed May 5, 2004. It was also published as "Colorization Using Optimization" in ACM Transactions on Graphics, Aug. 2004. Both these documents are incorporated herein by reference.

This applications was filed in a color version in the U.S. Patent Office as, U.S. Provisional Patent application 60/678.386 on May 5, 2005 and in a monochrome version in the PCT parent application. PCT/IL2005/000479, on May 5, 2005, with color images provided for the search and examination authorities. In addition, the color images are posted at http://www.cs.huji.ac.il/~yweiss/Colorization/Patent.pdf for the reference of the reader. References to a particular color (in referring to color in the PCT version) should be understood in the context of the US provisional application and the web site, whose disclosure and figures are incorporated by reference into the PCT application.

FIELD OF THE INVENTION

The present invention is concerned with adding color to an image or a series of images and/or with changing the color of one or more elements in the image.

BACKGROUND OF THE INVENTION

Colorization is a computer-assisted process of adding color to black and white single images or movies. The process typically involves segmenting images into regions and tracking these regions across image sequences. Colorization is a term introduced by Wilson Markle in 1970 to describe the computer-assisted process he invented for adding color to a black and white movie or TV program. The term is now used generically to describe any technique for adding color to monochrome stills and footage.

Neither of these tasks can be performed reliably in practice, and consequently colorization requires considerable user intervention and remains a tedious, time-consuming, and expensive task. For example, in order to colorize a still image an artist typically begins by segmenting the image into regions, and then proceeds to assign a color to each region. Unfortunately, even automatic segmentation algorithms often fail to correctly identify fuzzy or complex region boundaries, such as the boundary between a subject's hair and her face. Thus, the artist is often left with the task of manually delineating complicated boundaries between regions. Colorization of movies requires, in addition, tracking regions across the frames of a shot. Existing tracking algorithms typically fail to robustly track nonrigid regions, again requiring user intervention in the process.

Thus, while the advantages and substantial commercial value of colorization in coloring black and white movies and television programs is self evident, only limited numbers of vintage movies and television programs have been colorized.

In Markle's original colorization process (Canadian Patent 1,291,260), the disclosure of which is incorporated herein by reference, a color mask is manually painted for at least one reference frame in a shot. Motion detection and tracking is then applied, allowing colors to be automatically assigned to other frames in regions where no motion occurs. Colors in the vicinity of moving edges are assigned using optical flow, which often requires manual fixing by the operator.

Although not much is publicly known about the techniques used in more contemporary colorization systems used in the industry, there are indications that these systems still rely on defining regions and tracking them between the frames of a shot.

BlackMagic, a software product for colorizing still images (NeutralTek, 2003), provides the user with useful brushes and color palettes, but the segmentation task is left entirely to the user.

Various tools are available for smoothing edges between objects on an image. In general such tools are applied globally to an entire image and not in the context of colorization or are applied to edges manually based on a perception of need by a user.

A paper entitled "Poisson Image Editing" by Perez, P., et al.; ACM Transactions on Graphics, August 2003 pages 313-318 and available at http://research.microsoft.com/vision/cambridge/papers/perez_siggraph03.pdf shows editing methods for images including a method for partial de-colorization of an image (FIG. 11).

Welsh et al. (Welsh, T., Ashikhmin, M, and Muller, K (2002) "Transferring color to greyscale images" ACM Transactions on Graphics, 21, 3 (July), 277-280, the disclosure of which is incorporated herein by reference) describe a semi-automatic technique for coloring a greyscale image by transferring color from a reference color image. They examine the luminance values in the neighborhood of each pixel in the target image and transfer the color from pixels with matching neighborhoods in the reference image. This technique works well on images where differently colored regions give rise to distinct luminance clusters, or possess distinct textures. In other cases, the user must direct the search for matching pixels by specifying swatches indicating corresponding regions in the two images. While this technique has produced some impressive results, the artistic control over the outcome is quite indirect: the artist must find reference images containing the desired colors over regions with similar textures to those that she wishes to colorize. It is also difficult to fine-tune the outcome selectively in problematic areas. Also, the technique of Welsh et al. does not explicitly enforce spatial continuity of the colors, and in some images it may assign vastly different colors to neighboring pixels that have similar intensities.

It is understood that other types of images such as line images (cartoons and the like) are easier to colorize and that in a sense they come pre-segmented.

Two published US patent applications, 2003/0194119 to Manjeshwar et al, and 2003/0113003 to Cline et al, the disclosures of which are incorporated herein by reference, describe semi-automated methods of tissue segmentation. These publications describe the use of single-voxel seeds, chosen by the user as belonging to a body tissue of interest, which are automatically expanded to find the entire connected volume of that tissue, in this case a tumor found by a PET scan, and amyloid plaque found by MRI. General Electric also sells a product called Advantage Windows, which does fully automated segmentation of bone for CT scans. In practice, it is not possible to distinguish bone voxels from blood vessel voxels with 100% accuracy; even two different doctors, attempting to do this task manually, will generally not agree on all voxels.

SUMMARY OF THE INVENTION

An aspect of some embodiments of the present invention is concerned with a method of colorization of images of a scene that does not require the prior segmentation of the image.

In some embodiments of the present invention the method of colorization of an image or images determines a color of a portion of the image responsive to the colors of nearby portions and to a difference in brightness of the portion as compared to nearby portions, with the marked portions of the image being fixed during the procedure.

Optionally, various points or areas are marked on the image with different colors. Based on the markings, the rest of the image is colored.

Generally, the methods of the invention are based on the premise that nearby pixels in space-time that have similar gray levels should also have similar colors. Thus, in an embodiment of the invention, the changes in color can be said to locally follow the changes in intensity.

In a prior art segmentation approach a seed point and a segment to which it belongs is determined and a color is assigned to this segment. This process does not necessarily result in colors for the entire image-it might leave gray areas. On the other hand, in accordance with at least some embodiments of the present invention the colors of all image pixels are computed simultaneously and there are no pixels left without colors.

Furthermore, in a segmentation approach, the colorization is flat within each segment—i.e., each segment will be assigned a constant color. In the best case, such systems smooth the colors a little between segments boundaries manually. This will typically be done with a constant width smooth kernel. In many embodiments of the present invention, the color interpolation is dense, and the sharpness of the color interpolation depends on the sharpness of the gray edges. In a general image, except the pixels actually marked by the user, there may be high percentage of image pixels which will be assigned colors different from the marked color.

Optionally, in a Y, U, V space, the intensity of the image ($Y(x, y, t)$) remains unchanged in the colorization process. Only the color coordinates ($U(x, y, t)$ and $V(x, y, t)$ are changed.

In an embodiment of the invention each pixel (or small region) of an image of a scene is assigned a cost which is a function of the difference between the color of the pixel (region) and surrounding pixels weighted by a factor dependent on the intensity difference between the pixel (region) and surrounding pixels. Optionally, the weighting comprises a reduction of the cost when the region has a different intensity from the nearby pixels. Colorization is then carried out using a cost minimization technique, optionally minimizing the cost for the entire image.

Thus, changing the color between neighboring pixels is severely discouraged (by assigning a high cost to the pixel) unless the neighboring pixels have significantly different intensities.

In an embodiment of the invention, if a first area (or point) of the image is marked with a first color and a second area (or point) is marked with a second color, then the transition between the first and second colors between the markings will depend on the rate of change of the intensity of the image between them. If the rate of change is slow (e.g., there is a sloped change in intensity, no discernable boundary or more than one boundary) then the color will transition between the two areas in a smooth manner. If the transition in intensity is abrupt, then the change will be abrupt.

If a segmentable region is not marked, then if it is surrounded by a region taking on a single color, it will also take on that color. If it is between two regions of different color it will usually either have an intermediate color or take on one of the neighboring colors, depending on the rates of change of the intensity between the color markings. The inventors have found that when the method of the invention is used, the colored image generally has all of the pixels colored, even when the markings are only made over some of the areas that would be segmented, were a segmentation algorithm employed. This makes colorization easier and results in a more pleasing end result.

An aspect of some embodiments of the invention is concerned with colorization of sequences of images.

In an embodiment of the invention, motion between pixels in two neighboring images in a sequence is measured (using any available method of the art). The neighborhoods of pixels (both for the markings and the image pixels) are optionally defined in 3D (the third dimension being "t" i.e., the neighboring pixels in the adjacent image), after accounting for motion. Colorization proceeds as described above, with the minimum cost being determined for two neighboring images together. Using this method, only 10%, 20% or fewer percent of images in a sequence need be marked. Furthermore, if only one object in an image of a sequence becomes miss-colored, this can be corrected by marking a color on this object only and subsequent images can use the coloration of this image.

An aspect of some embodiments of the invention deals with partial de-colorization or recolorization of an image. In an embodiment of the invention markings are placed on those areas to be de-colored and different markings are placed on those areas for which the color is not meant to change. A cost factor is associated with the portions of the image not associated with the markings and a least cost solution is determined. For recolorization color marings are made on the areas to be recolored with those areas not to be recolored marked by a special color, such as white or gray.

There is thus provided, in accordance with an embodiment of the invention, apparatus for colorization of images, comprising:

an image display;

a user input adapted to mark an image displayed on the display with multiple color markings, at least some of which are in different colors; and a controller, which receives the user generated markings and colors the image responsive to the marked colors and the intensity of the original image, such that colors from various markings are mixed in at least some regions of the image, the extent of said mixing dependent on differences between the intensity thereat and at nearby pixels in the image.

In an embodiment of the invention, the displayed image is a black and white image containing objects and wherein the controller colorizes the entire image, based on the markings, even when some objects are not marked.

Optionally, the extent of said mixing is dependent on a scalar factor of differences of the intensity thereat and at nearby pixels in the image.

In an embodiment of the invention, the controller generates a cost for each small region of the image, said cost being based on a difference between a color to be assigned to the small region and the color of neighboring pixels and a difference between the intensity of the small region and the neighboring pixels. Optionally, small regions consist of single pixels. Optionally, the controller finds a minimum cost for each of the small regions of the image and colors the image with colors according to said minimum cost. Optionally, the minimum cost is a global minimum cost considering all of the pixels being colored. Optionally, the generated cost increases with increasing color difference between nearby pixels. Optionally, the generated cost decreases with increasing intensity difference between neighboring pixels.

In an embodiment of the invention, the intensity of the pixels in the image is preserved or substantially preserved during the colorization.

In an embodiment of the invention when a plurality of different color markings are marked on a same object, the colors between the markings are blended between said colors.

There is further provided, in accordance with an embodiment of the invention apparatus for changing colorization of colored images, comprising:

an image display;

a user input adapted to mark an original image displayed on the display with multiple color markings, at least some of which are in different colors; and a controller, which receives the user generated markings and colors the image responsive to the marked colors and the colors of the original image, such that colors from various markings are mixed in at least some regions of the image, the extent of said mixing dependent on a scalar factor that represents the differences of the original image thereat and the color of nearby pixels in the original image.

Optionally, the color markings are used to designate areas for which the color is to be preserved and areas that are to be decolorized and wherein coloring of the image is responsive to the colors under the markings for the preserved indication and no color for portions of the image having the no color markings.

In an embodiment of the invention, the controller generates a cost for each small region of the image, said cost being based on a difference between a color to be assigned to the small region and the color of neighboring pixels and a difference between the original color of the small region and the neighboring pixels. Optionally the small regions consist of single pixels. Optionally, the controller finds a minimum cost for each of the small regions of the image and colors the image with colors according to said minimum cost. Optionally, the minimum cost is a global minimum cost considering all of the pixels being colored. Optionally, the generated cost increases with increasing color difference between nearby pixels. Optionally, the generated cost decreases with increasing intensity difference between neighboring pixels.

There is further provided, in accordance with an embodiment of the invention, a method for colorization of images, comprising:

marking an image with multiple color markings, at least some of which are in different colors; and automatically coloring the image responsive to the marked colors and the intensity of the image, such that colors from various markings are mixed in at least some regions of the image, the extent of said mixing dependent on differences of the intensity thereat and at nearby pixels in the image.

Optionally, the extent of said mixing is dependent on a scalar factor of differences of the intensity thereat and at nearby pixels in the image.

There is further provided, in accordance with an embodiment of the invention, a method for colorization of images, comprising:

marking an image with multiple color markings, at least some of which are in different colors;

assigning a cost to each pixel responsive to the difference between the color to be assigned to that pixel and neighboring pixels and the difference in intensity between that pixel and neighboring pixel;

minimizing the cost without constraining the assigned colors to match the color markings, except at the markings themselves.

There is further provided, in accordance with an embodiment of the invention, a method for colorization of images, comprising:

marking an image with multiple color markings, at least some of which are in different colors;

automatically changing, by a computer, the colors responsive to said markings wherein at least some of the pixels in the image are assigned a new color, different from its original color, that is different from the color of any of said markings in regions of low or zero intensity gradient.

Optionally, said color different from the color of any of the markings is a blend of the colors of the marking.

Optionally, marking comprises marking by a user.

There is further provided, in accordance with an embodiment of the invention, a method for colorizing of images, comprising;

providing an image having a plurality of objects having similar intensities and separated by at least one gap;

marking fewer than all of the objects with a marking having a first color and marking an area continuous with said gap with a second marking having a second color; and automatically coloring at least one of the unmarked objects with the first color, responsive to the size of the gap and the differences of intensities between the two regions and the gap.

There is further provided, in accordance with an embodiment of the invention, a method for colorizing a series of images having objects that move within the image and comprising:

marking regions within a first image with color markings at first positions;

determining a position transformation of pixels of the first image in another image;

determining a neighborhood of each pixel comprising nearby pixels, said neighborhood comprising pixels surrounding the pixel in the image in which is it situated and pixel and pixels at and surrounding said transformed position in the other of said first and another images;

assigning a cost to each pixel in both images responsive to the difference between the color to be assigned to that pixel and pixels in said neighborhood;

minimizing the cost for both images together without constraining the assigned colors to match the color markings, except at the markings themselves; and automatically coloring the first and other images based on the determined minimum cost.

Optionally, automatically coloring comprises coloring the image responsive to the marked colors and the intensity of the image, such that colors from various markings are mixed in at least some regions of the image, the extent of said mixing dependent on differences of the intensity thereat and at nearby pixels in the image. Optionally, the extent of said mixing is dependent on a scalar factor of differences of the intensity thereat and at nearby pixels in the image. Optionally, the minimum cost is a global minimum cost considering all of the pixels being colored.

There is further provided, in accordance with an embodiment of the invention, a method for colorization of images, comprising:

marking an image with multiple color markings, at least some of which are in different colors;

assigning a cost to each pixel responsive to the difference between the color to be assigned to that pixel and neighboring pixels and the difference in intensity between that pixel and neighboring pixel;

minimizing the cost without constraining the assigned colors to match the color markings, except at the markings themselves.

In an embodiment of the invention, the intensity of the pixels in the image is preserved or substantially preserved during colorization.

In an embodiment of the invention, the method does not attempt to have the assigned colors equal or proportional to the gradient of the intensity or original colors.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Exemplary non-limiting embodiments of the invention are described in the following sections with reference to the drawings. The drawings are generally not to scale and the same or similar reference numbers are used for the same or related features on different drawings.

FIGS. 12A to 12C illustrate an example of re-colorization of an optical image, according to an embodiment of the invention;

FIGS. 13A to 13C illustrate an example of partial de-colorization of an optical image according to an embodiment of the invention.

DESCRIPTION OF EXEMPLARY EMBODIMENTS

Figure 1:
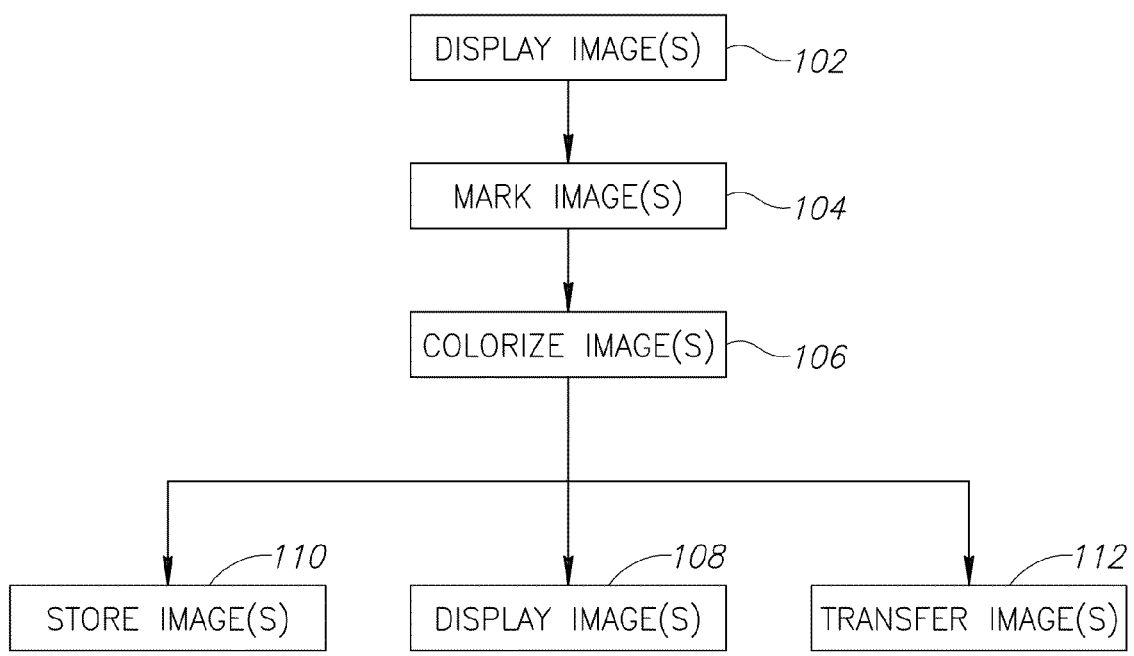
FIG. 1 is a flow chart illustrating a method of colorization of a black and white images, according to an embodiment of the invention.

FIG. 1 is a flow chart 100 illustrating a method of colorization of an image, in accordance with an embodiment of the invention.

First, monochrome images are optionally displayed (102) on a display. Next places on the image are marked (104) with various colors. These markings are sometimes referred to as scribbles herein (even when they are only dots of color).

Figure 2A:
FIGS. 2A and 2B show images of a child as marked for and after colorization, according to an embodiment of the invention.

FIG. 2A illustrates an image 200 of a child lying on some pillows in which various places have been marked. For example, a child's shirt 202 has been marked with a yellow set of scribbles 204, the center of a daisy 206 has been marked with a red scribble 208, sleeves 210 of the shirt have been marked with a green scribble 212, face portions 214 and arm portions 215 have been marked with flesh color scribbles 216 and 217, having different hues, some hair 232 portions have been marked with dark brown scribbles 234 and others have been marked with lighter brown scribbles 236 to indicate highlights. Pillows 218 have been marked with blue scribbles 220 and a sheet 222 underlying pillows 218 is marked with a light pink scribble 224.

Figure 3:
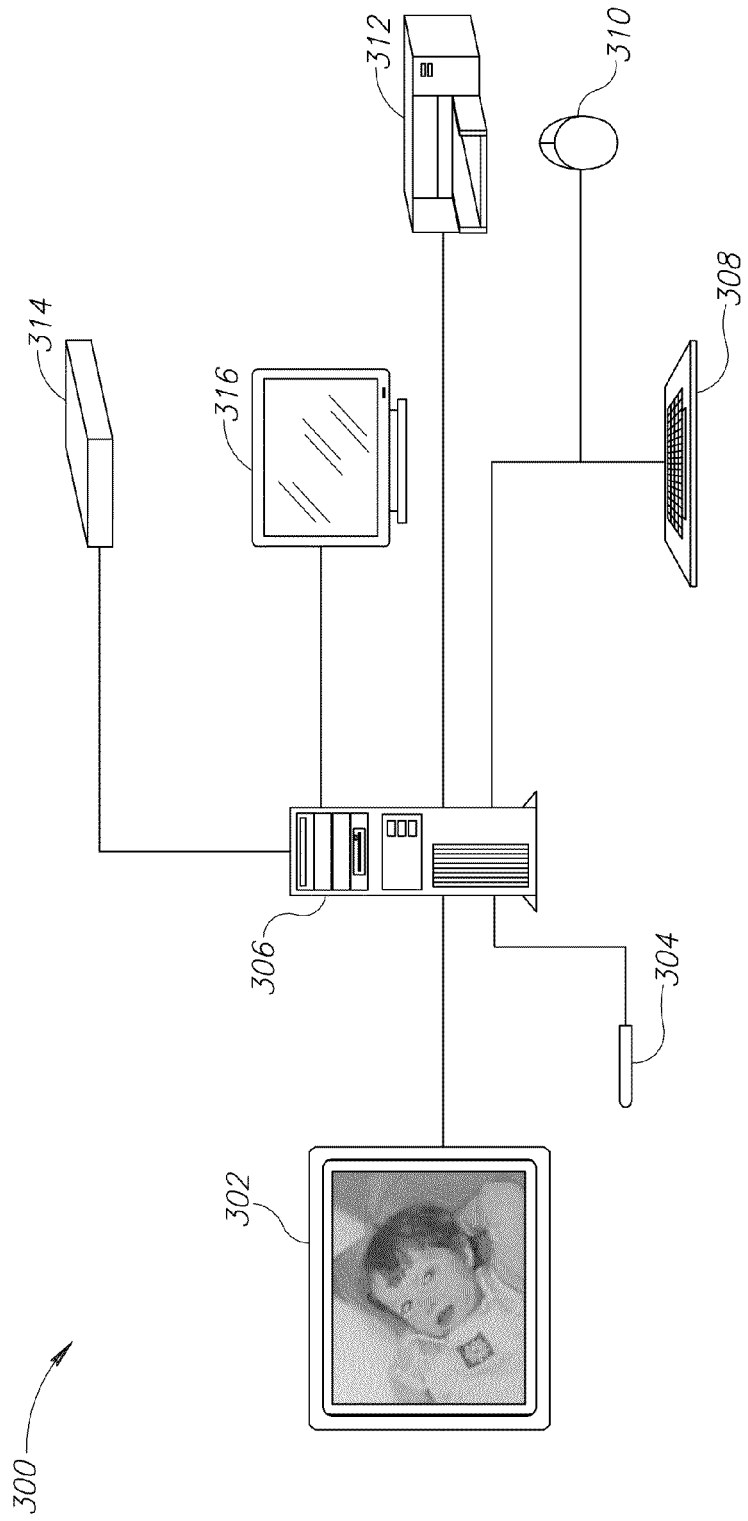
FIG. 3 is a schematic illustration of an apparatus for colorization of images, according to an embodiment of the invention.

Note that flesh colored scribbles 216 are redder than flesh colored scribbles 217 to give an appearance of red cheeks. This feature allows for the easy introduction of highlights and color-lights in relatively uniform areas, something which is available in prior art methods only with some artistry FIG. 3 illustrates an exemplary system 300 for marking such images. It can be based on a PC with appropriate computational resources or can be a dedicated system. System 300 includes an interactive display 302 (shown here as a tablet), a marker 304 and a computer 306. The system may (and often will) have additional components, such as a keyboard 308 and/or mouse 310 for inputting commands to the system, a printer or other hard copy device 312 and various internal and external storage devices 314. It can also have a separate monitor 316 for non-graphic applications or for replacement of display 302.

In use an image, such as an unmarked version of image 200, is displayed on display 302. The image on display 302 is marked with marker 304 with different colors, in a manner such as shown in FIG. 2A. A color pallet is provided optionally on display 302 and marker 304 indicates, in a manner such as is well known in the art, which color should be marked by marker 304.

While a stylet type marker is shown, a mouse can also be used to mark colors on the image.

Returning to FIG. 1, the image is colorized (106) by computer 306, using the methods of the invention, as described below. In general, the method will be embodied in software that is stored on computer 306. The colorized image is displayed (108), stored (110) and/or transferred (112) to another site or a server. Alternatively, dedicated hardware is used to accelerate some or all of the colorization process.

Figure 2B:
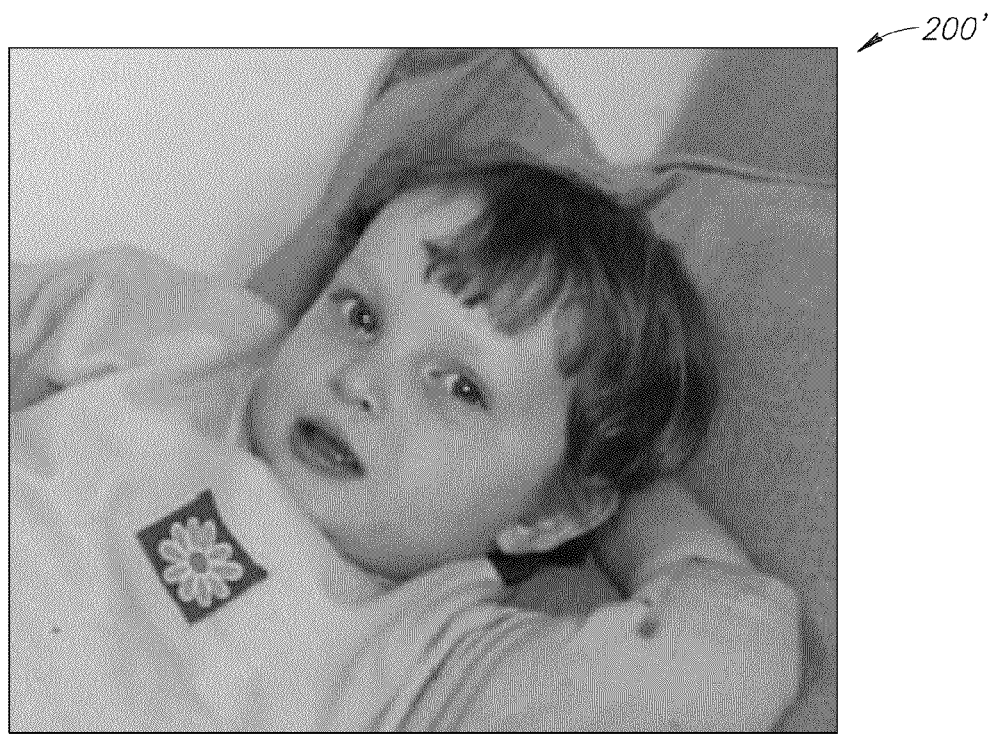

Before describing various embodiments of the colorization method of the invention, a colorized image 200' of image 200 as shown FIG. 2B is referred to. Each of the areas of the image have been colored by computer 306 carrying out the method. Note that the hair has a desired highlight where the light brown color was marked and that the child appears to have reddish cheeks, despite the fact that there are no relevant boundaries in the image. As shown, relatively broad brush markings are capable of quite striking results.

Figure 4:
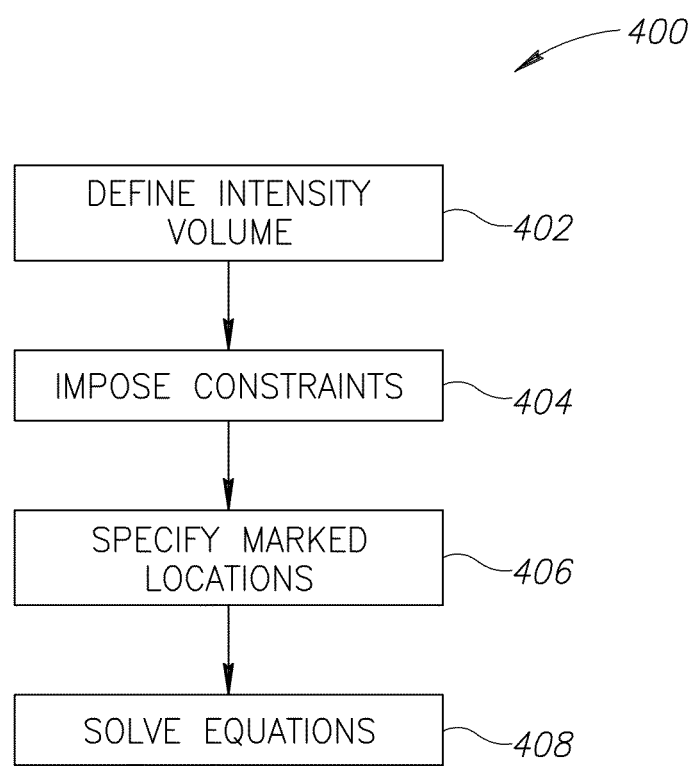
FIG. 4 is a flow chart of an exemplary colorization algorithm.

FIG. 4 is a flow chart 400 of an exemplary method of colorization. This method corresponds to one way of carrying out act 106 of method 100 (FIG. 1).

The method illustrated in FIG. 4 utilizes the (Y, U, V) color space, commonly used in video, where Y is the monochromatic luminance channel (which we refer to simply as intensity, while U and V are the chrominance channels, encoding the color.

First, an input intensity volume for the image is defined at 402 as Y(x, y, t). Note that "t" is a constant for a single image. However, it is used in colorization of series of images, as described below. An object of the method is to output two color volumes U(x, y, t) and V(x, y, t). To simplify notation boldface letters (e.g. r, s) are used to indicate (x, y, t) triplets. Thus, Y(r) refers to a particular pixel in the intensity volume. It should be understood that the same algorithm can be used for coloring three dimensional images, in which case an extra variable is present for each of Y, U and V.

Next a constraint that two neighboring pixels r, s should have similar colors if their intensities are similar, is imposed (404). Then the difference between the color U(r) at pixel and a weighted average of the colors at neighboring pixels is determined.

The constraint can be formulated as:

$$J(U) + \left( \sum_r \left( U(r) - \sum_{s \in N(r)} w_{rs} U(s) \right)^2 \right) \quad (1)$$

where $w_{rs}$ is a weighting function that sums to one, is large when Y(r) is similar to Y(s), and small when the two intensities are different.

Similar weighting functions are used extensively in image segmentation algorithms, for example in Weiss, Y. "Segmentation using Eigenvectors: A unifying view" in Proceedings ICCV (1999), pages 975-982 and Shi, J. and Malik, J. "Normalized cuts and image segmentation" in Proc. IEEE Conf. Computer Vision and pattern Recognition (1997) Pages 731-737, the disclosures of which are incorporated herein by reference, where they are usually referred to as affinity functions.

Two weighting functions have been tried by the inventors. The simplest one is commonly used by image segmentation algorithms and is based on the squared difference between the two intensities:

$$w_{rs} \propto e^{-(Y(r)-Y(s))^2/2\sigma_r^2}. \quad (2)$$

A second weighting function is based on normalized correlation between the two intensities:

$$w_{rs} \propto 1 + \frac{1}{\sigma_r^2}(Y(r) - \mu_r)(Y(s) - \mu_r) \quad (3)$$

where $\sigma_r$ and $\mu_r$ are the mean and variance of the intensities in a window around r. The size of the windows used for the "neighborhood" can vary depending on the edge or other effects desired. For example 3×3 or 5×5 kernels are generally used. However, using larger kernels will usually result in smoother transitions. It is noted that the weighting functions described above are scalar functions. While it is possible to use vector function of the differences, such as the gradient, using such functions give generally unreliable results. Optionally mixtures of scalar and vector weighting functions could be used.

The correlation affinity (i.e., the weighting factor of equation 3) can also be derived from assuming a local linear relation between color and intensity as is shown in Zomet, A., and Peleg, S., "Multi-sensor super resolution" Proceedings of the IEEE Workshop on Applications of Computer vision" (2002) and Torralba, A and Freeman, W. T. "Properties and applications of shape recipes" IEEE Computer Vision and Pattern Recognition (CVPR) (2003), the disclosure of both of which are incorporated herein by reference. Formally, it assumes that the color in a window around a pixel U(r) is a linear function of the intensity Y(r) i.e., $U(r)=a_i Y(r)+b_i$ and the linear coefficients $a_i$ and $b_i$ are the same for all pixels in a small neighborhood around r. This assumption can be justified empirically and intuitively means that when the intensity is constant, the color should be constant and when the intensity is an edge the color should also be an edge (although the values on the two sides of the edge can be any two numbers). While this model adds to the system a pair of variables per each image window, a simple elimination of the $a_i$, $b_i$ variables yields an equation equivalent to equation (1) with a correlation based affinity function. It should be noted that Zomet and Peleg utilized these correlation affinities for a very different problem. Also, they only used a similar model for their motivation, but they ended up with a different cost and a different optimization problem.

The notation r∈N(s) r N refers to the fact that r and s are neighboring pixels. In a single frame, we define two pixels as neighbors if their image locations are nearby, i.e., within the window size described above. Between two successive frames, we define two pixels as neighbors if their image locations, after accounting for motion, are nearby. More formally, let $v_x(x, y), v_y(x, y)$ denote the optical flow calculated at time t. Then the pixel $(x_0, y_0, t)$ is a neighbor of pixel $(x_1, y_1, t+1)$, if:

$$\|(x_0+v_x(x_0), y_0+v(y_0))-(x_1, y_1)\| \leq T \quad (4)$$

The flow field $v_x(x_0)$, $v(y_0)$ is optionally calculated using a standard motion estimation algorithm such as that defined in Lucas, B., and Kanade, T. "An iterative image registration technique with an application to stereo vision" Proc. Int. Joint Conf. AI (1981) Pages 674-670), the disclosure of which is incorporated herein by reference. Note that, in preferred embodiments of the invention the optical flow is only used to define the neighborhood of each pixel, not to propagate colors through time.

Next (406) given a set of locations $r_i$ where the colors are specified by the user $u(r_i)=u_i$, $v(r_i)=v_i$, J(U), J(V) (i.e., equation 1) are minimized subject to these constraints. Since the cost functions are quadratic and the constraints are linear, this leads to a large, sparse system of linear equations, which may be solved (408) using a number of standard methods. This results, in this embodiment of the invention, in a unified solution in which the overall cost function for the entire image (or the portion of the image being colorized) which is a minimum.

Note that in varying U and V to reach minimum cost, the pixels under the user markings are not varied.

The algorithm discussed above with respect to FIG. 4 is closely related to algorithms proposed for other tasks in image processing. In image segmentation algorithms based on normalized cuts (Shi and Malik, mentioned above), one attempts to find the second smallest eigenvector of the matrix D−W, where W is an n-pixels×n-pixels matrix whose elements are the pair-wise affinities between pixels (i.e., the r,s entry of the matrix is $w_{rs}$) and D is a diagonal matrix is the sum of the affinities (in the present case always 1). The second smallest eigenvector matrix of any symmetric matrix A is a unit norm vector x that minimizes $x^T A x$ and is orthogonal to the first eigenvector. By direct inspection, the quadratic form minimized by normal cuts is exactly the present cost function J, that is $(x^T(D-W)x)^2=J((x)$. Thus the present algorithm minimizes the same cost function (Equation 1) but under different constraints.

In image denoising algorithms based on anisotropic diffusion (See for example, Perona, P. and Malik, J. "Scale-space and edge detection using anisotropic diffusion" IEEE Trans. on PAMI, vol. 8, no. 5, Pages 565-593 (1989) and Tang. B, et al, "Color image enhancement via chromaticity diffusion" IEEE Trans. on Image Processing, vol. 10, no. 5, pages 701-708 (2001), (the disclosures of which are incorporated herein by reference), one often minimizes a function similar to equation (1), but the function is applied to the image intensity as well.

The colorization results presented herein were all obtained using the correlation based window (equation (3), or equivalently using the local linearity assumption).

Visually similar results were also obtained with the Gaussian window (equation (2)). For single frames Matlab's built in least square solver for sparse linear systems was used and for movie sequences a multigrid solver (Press, W. et al. "Numerical Recipes in C: The art of scientific computing," Cambridge University Press, pages 871-887, (the disclosure of which is incorporated by reference). Using the multigrid solver, the run time was approximately 15 seconds per frame. The threshold T in equation 4 was set to 1, so that the window used was 3×3×3. For single frames a multigrid solver can colorize an image in about 3 seconds. It is expected that optimization of the algorithm and utilization of hardware acceleration can reduce this time very significantly.

Figure 5A:
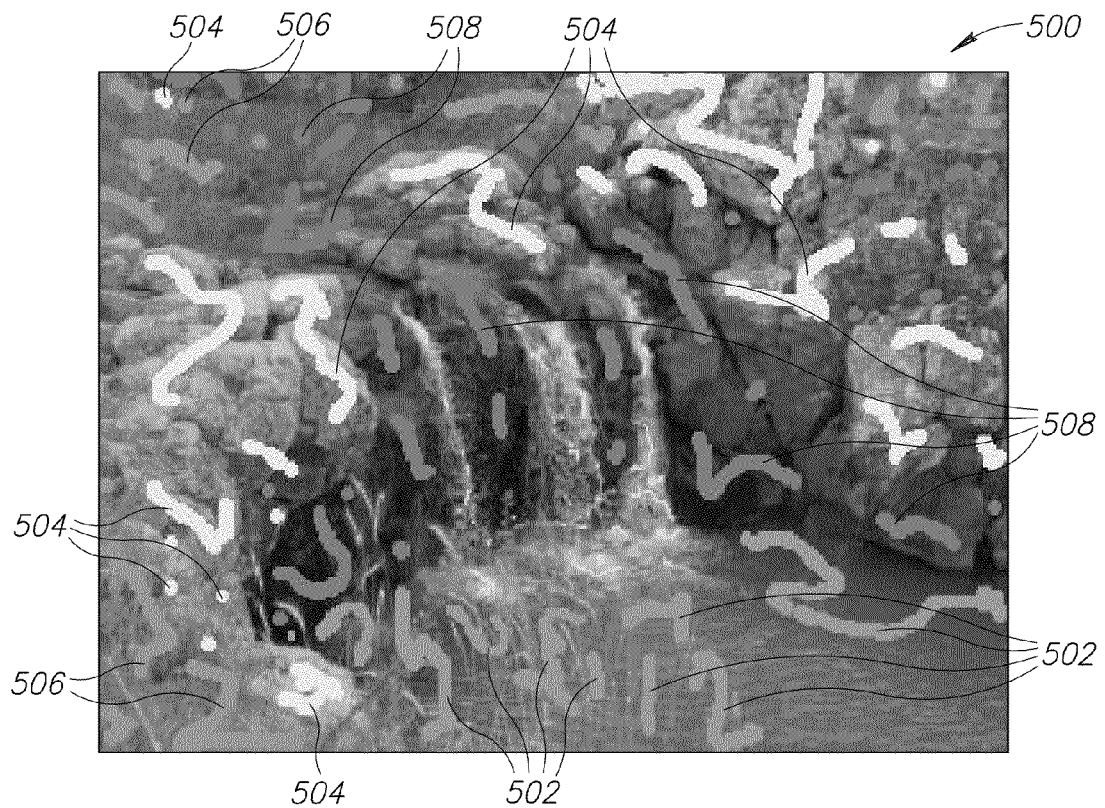
FIGS. 5A and 5B show images of a scene with a waterfall as marked for and after colorization, according to an embodiment of the invention.
Figure 5B:
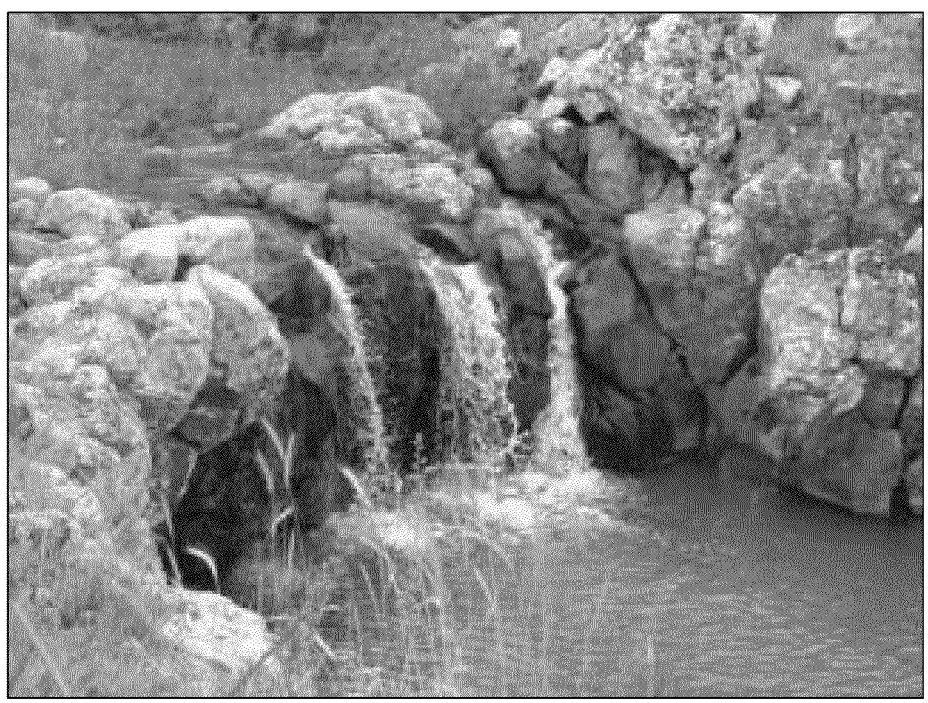

FIGS. 5A and 5B show a waterfall scene (500, 500') in which effective colorization can be performed using only a limited number of color markings, despite the relative complexity of the scene and the fine detail of the elements.

The image is marked with a number of scribbles in white (504), light green (502), a somewhat darker green (506) and tan (508). It is noted that high intensity portions of the image remain white, even after colorization.

As seen in the re-colored image 500' of FIG. 5B, the use of white markings on the rocks of the image makes nearby portions of the rock have a bleached look, the falling water remains white, grassy areas of the shore become green and the water in the pool takes on a murky green-gray color. The use of color splotches results in a highlighted and pleasingly non-uniform color to parts of the land portion.

Figure 6A:
FIGS. 6A and 6B show images of the front of the Monte Carlo Casino as marked for and after colorization, according to an embodiment of the invention.
Figure 6B:
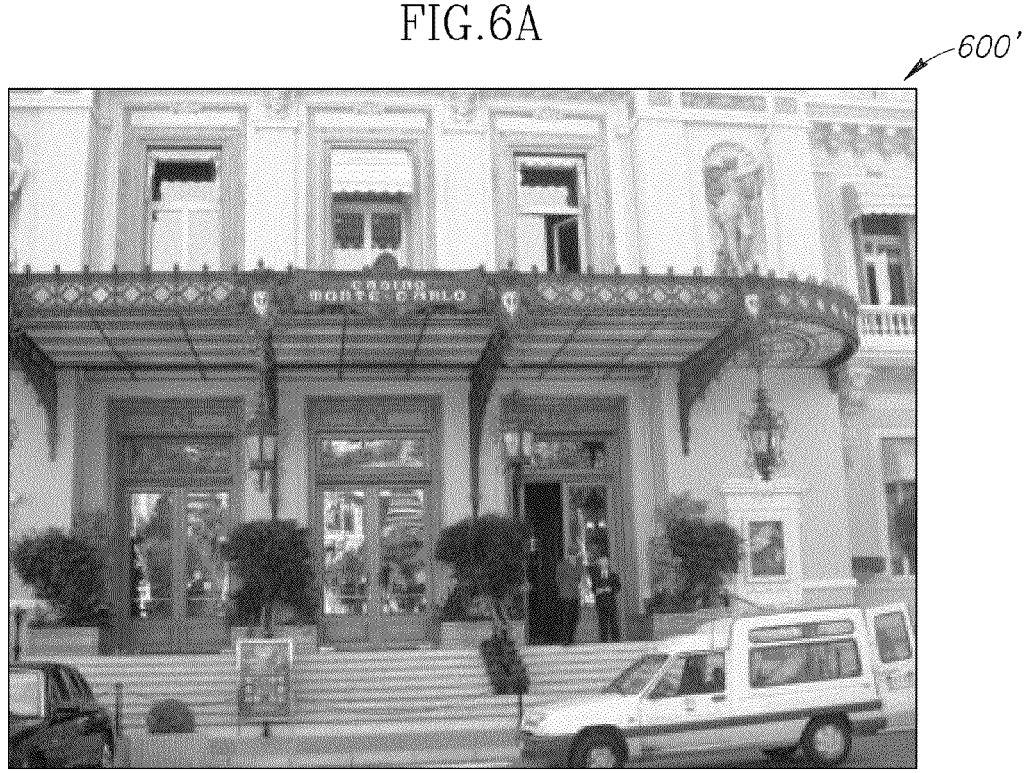

FIGS. 6A and 6B illustrate coloration of an even more complex scene 600 of a hotel front. Due to the fine detail, thinner lines of color are used. However, relatively few applications of white (602) blue (604), light brown (606), darker brown (608), pale blue (610), red (612), green (614), pale yellow (616), light green (620) and dark blue (620), a very richly colored scene is achieved (FIG. 6A, scene 600'). Note that all of the image is colored and continuity of color is achieved.

Figure 7A:
FIGS. 7A and 7B show images of a child as marked for and after colorization, according to an embodiment of the invention.
Figure 7B:

FIGS. 7A and 7B show yet another instance of colorization in which the emphasis is on effects on the hair and facial coloring. As shown, image 700 with a few scribbles of skin color 702, brown 704, light brown 706, red 710, peach 712 and gray 716. The black and white image is transformed as shown in FIG. 7B. Note especially the variations in skin shading using the method and the lifelike variations in hair color.

Figure 8A:
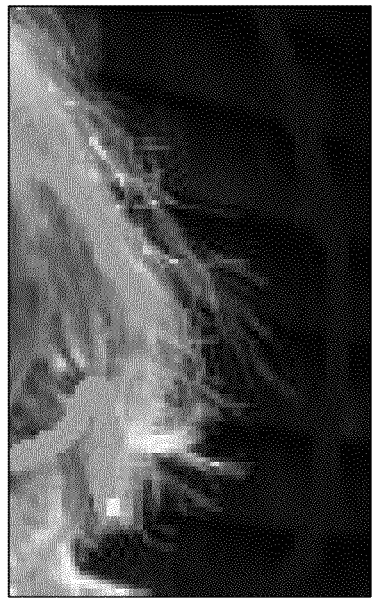
FIGS. 8A and 8B show zoomed images of a portion of the hair the child of FIGS. 7A and 7B respectively, showing the ability of the method in colorizing fine features such as hair against a background, according to an embodiment of the invention.
Figure 8B:
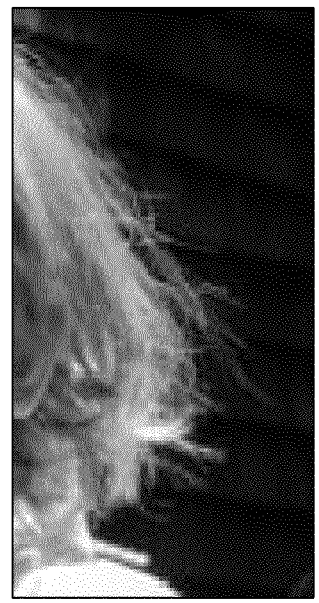

FIGS. 8A and 8B show zoomed areas of the hair on the dark background of FIGS. 7A and 7B respectively. Note that not only is the hair shape and extent effectively preserved, but the color is made to extend along substantially the entire length of single strands of hair, which would be impossible using segmentation techniques, without, at the very least, substantially more input colorations and touch-up.

FIGS. 9A, 9B, 10A, 10B illustrate an effect of using the present method which helps to illustrate part of the reason why the pleasing transitions, such as the red cheek effect as shown in the previous Figs. and coloring of thin elements such as hair as shown in FIGS. 5A, 5B and 8A, 8B are possible.

Figure 9A:
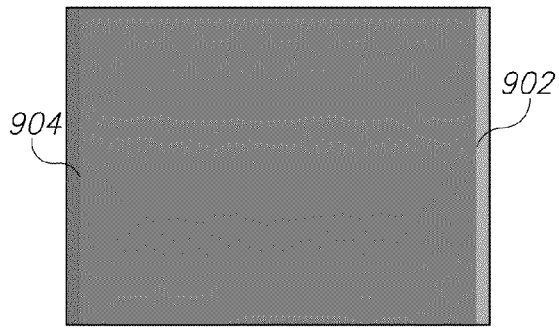
FIGS. 9A and 9B show a region without an edge, before and after colorization, according to an embodiment of the invention.
Figure 9B:
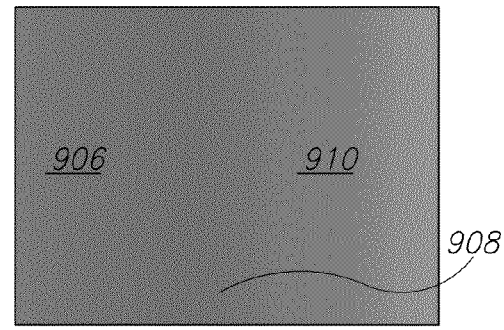

In FIG. 9A a colorless area is marked at one end with a blue bar 902 and at the other end with a red bar 904. After application of the colorization algorithm described above a fairly uniform transition between the colors is effected, as shown in FIG. 9B with a red area on the left, a blue area 910 on the right and a transition area 908 in the middle.

Figure 10A:
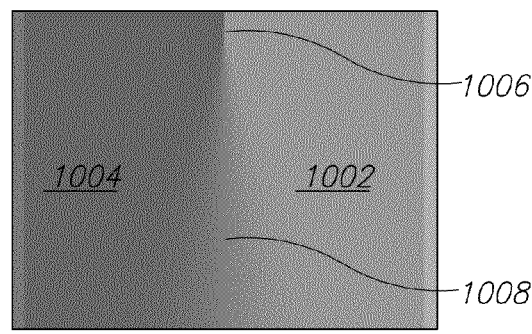
FIGS. 10A and 10B show a region including a sharp edge and an indistinct edge, before and after colorization, according to an embodiment of the invention.
Figure 10B:
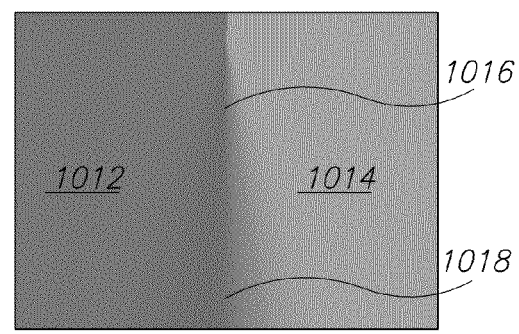

In FIG. 10A Blue (1002) and red (1004) bands are positioned as in FIG. 9A. However, the intermediate gray area is not uniform. Rather, it is darker near the red than the blue marking. In addition, the transition 1006 near the top of the image is sharp while the transition becomes more diffuse toward the bottom of the image. As seen in FIG. 10B, the color transition from red 1012 to blue 1014 is similarly sharp at 1016 and diffuse at 1018.

Figure 11A:
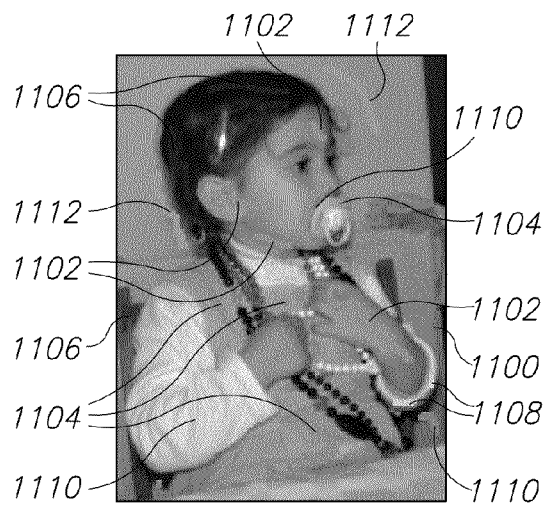
FIGS. 11A to 11F show the effect of initial color markings on an optical image.
Figure 11B:
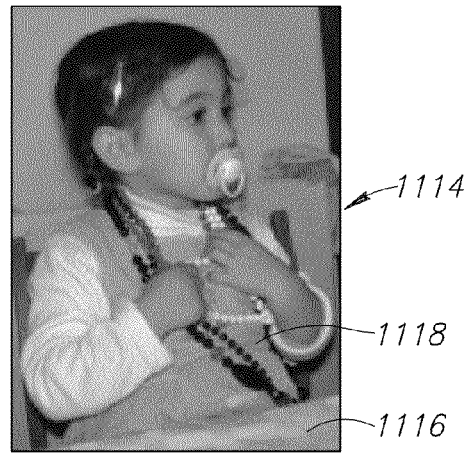
Figure 11C:
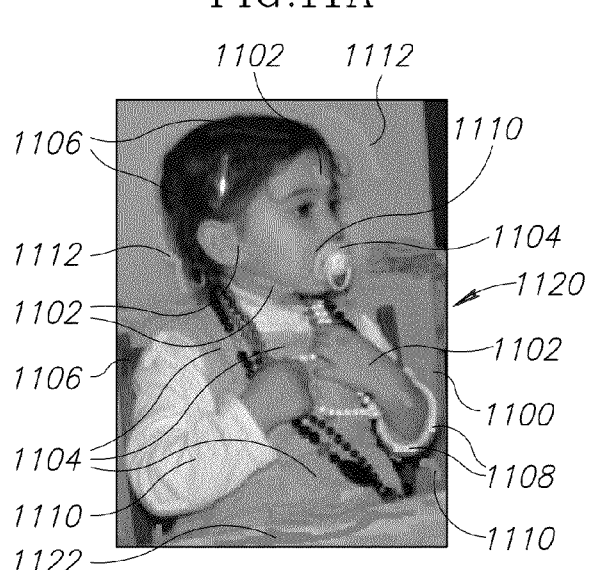
Figure 11D:
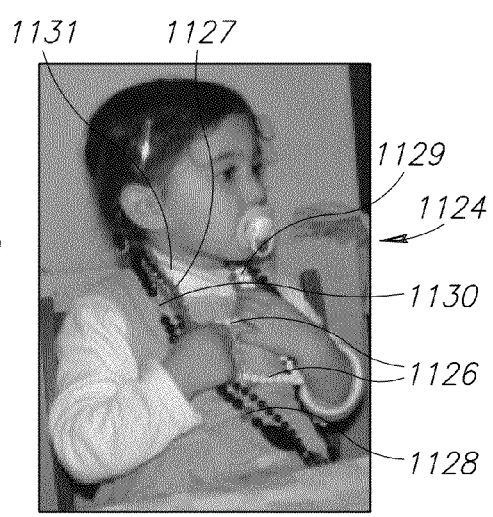

FIGS. 11A-11F show how changes in the scribbles of color can change the result, giving good control to the user and also illustrate some other features of the method. It also shows how simple it is to make coloration corrections. In FIG. 11A a black and white picture of a girl 1100 is marked with flesh colored (1102), pink (1104), brown (1106), white (1110) and pale green (1112) scribbles. In the resulting image 1114, shown in FIG. 11B, a tablecloth 1116 takes on the coloration 1104 of dress 1118. In FIG. 11C, which is a black and white image the same as that of FIG. 11A, the scribbles are the same as in FIG. 11A, however, the tablecloth is marked with an additional lighter brown scribble (1122). In the resulting image 1124, shown in FIG. 11D, the tablecloth is a light brown color. Note however, that all of the beads on the child have taken on the coloration of the dress. Thus, string of beads 1126, bead 1130 and bead 1128 have taken on the coloration of their surroundings and are bright pink, pink and pink respectively. The other beads which are darker are various shades of brown/pink depending on their surroundings. Note that because of their proximity to the bright white shirt 1131, beads 1129 are colored white. Beads 1127 are brownish pink. This is anomalous with respect to beads 1126.

Figure 11E:
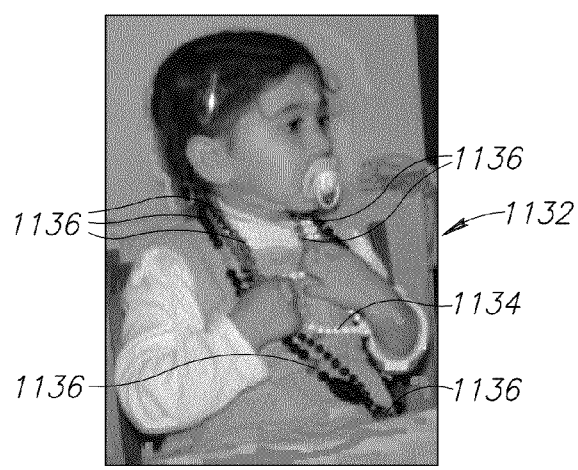
Figure 11F:
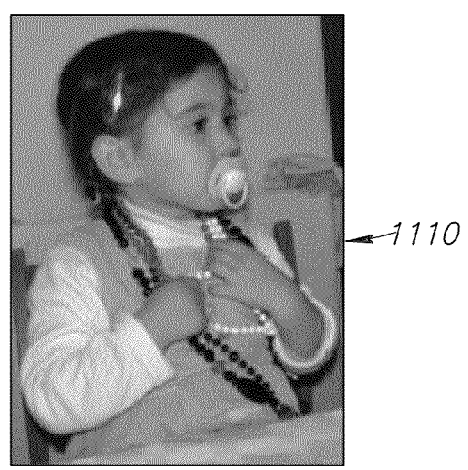

In FIG. 11E, image 1132 has been marked (in addition to the markings of image 1120) with red (1136) and white (1134) resulting in strings 1126 being colored white and in all of the other marked beads taking on a reddish tint. Note also that even though only some of the beads in a string were marked, due to their proximity and similar brightness, nearby beads have taken on the same coloration in image 1138 in FIG. 11F. This feature of the method is important since it allows for coloring of separate nearby objects by marking only a few of them, avoiding a time consuming task of the prior art. As used herein, the term object is used to refer to a portion of the image that is delineated by a well defined border of intensity change or color change.

FIGS. 12A, 12B and 12C show how changes in coloration can be easily achieved. An image 1200 of a child 1202 on a chair with blue upholstery 1204 with wood arms is shown in FIG. 12A. In FIG. 12B, white color scribbles 1208 are scribbled on the child and on the arms of the chair. The upholstery is scribbled in blue 1210. In the color change mode, white is used to indicate that the underlying color should be preserved FIG. 12C shows the result of the re-colorization. Except for the change in the color of the upholstery to blue, no other changes in the image have occurred.

It should be understood that in the colorization change of images, the area of the scribbles takes on the color of the scribbles (or for the unchanged areas, the original color), and the other areas are then optimized according to the method described above, with the initial colorization optionally modifying or taking the place of the intensity in $w_{rs}$. This generally results in the "unchanged" regions being substantially unchanged and the area contiguous with the change color scribbles taking on the color of the scribble. Of course, if the transition between these areas is not distinct, there will be a smooth transition of colors as well.

Optionally, the color transitions (or the affinities, defining when it's cheaper to change color) in this case are defined not only based on the gray (intensity) differences, but also based on the changes of the colors in the original color image. Optionally, in the recoloring case only the U, V channels are changed and the intensity is substantially preserved in the original image. In some embodiments of the invention it is changed less than 5% or 10%. In preferred embodiments the intensity is preserved.

FIGS. 13A-13C show an example of partial decolorization of an image. In this series FIG. 13A is the original image. In FIG. 13B the fish is marked in white 1303, which for a decolorization mode indicates that the color should not be changed and partially surrounded with gray scribbles 1302. Using the method described above, this results in the image shown in FIG. 13C, in which everything except the fish has been decolored. As in the recolorization the initial colorization optionally modifies or takes the place of the intensity in $w_{rs}$.

FIGS. 14A-C and 15A-15B compare the present method to two alternative prior art methods.

Figure 14A:
FIGS. 14A to 14C show a comparison of the present method of colorization with a segmentation method of the prior art.
Figure 14B:
Figure 14C:
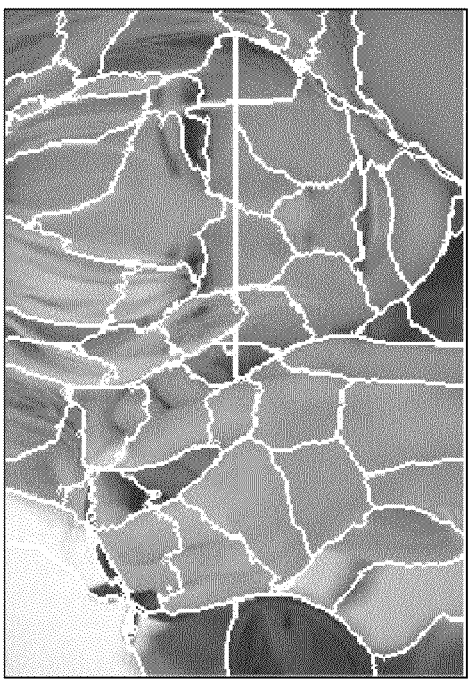

In FIGS. 14A-14C the alternative method is one in which the image is first segmented automatically and then the scribbled colors are used to "flood fill" each segment. FIG. 14 shows the result of automatic segmentation computed using a version of the normalized cuts of the Shai and Malik paper referenced above. Segmentation is a very difficult problem and even state-of-the-art methods may fail to automatically delineate all the correct boundaries, such as the intricate boundary between the hair and the forehead, or the low contrast boundary between the lips and the face. Consequently, the colorization shown using this alternative method FIG. 14B is noticeably worse than the one computed using the present method. In both cases, the same color scribbles were used. Distinctive colors were deliberately chosen so that flaws in the colorization would be more apparent.

Figure 15A:
FIG. 15A to 15D compare the present method of colorization of sequential images with a method of the prior art.
Figure 15B:

FIGS. 15A-15B compare the present method for colorizing image sequences to an alternative method where a single frame is colorized and then optical flow tracking is used to propagate the colors across time. Since the present method uses optical flow only to define the local neighborhood, it is much more robust to tracking failures, since the coloration will continue to follow the intensity variations to a great extent.

In both cases, either using automatic segmentation or using tracking to propagate colors across time, the results could be improved using more sophisticated algorithms. In other words, if the automatic segmentation was perfect then flood filling segments would produce perfect results, and likewise, if dense optical flow was perfect then propagating colors from a single frame would also work perfectly. Yet despite many years of research in computer vision, state-of-the-art algorithms still do not work perfectly in an automatic fashion. An advantage of the presently described optimization framework is that segmentation cues and optical flow are used as "hints" for the correct colorization but the colorization can be quite good even when these hints are wrong.

Figure 15C:
Figure 15D:

FIGS. 15A and 15B show the second and ninth frames of sequence, colored using the conventional algorithm. Note that in addition to the initial errors, shadows of color develop by the ninth image. FIGS. 15C and 15D show the second and ninth frames of a sequence, colored using the methods described above. Not only is the initial image coloration better, the coloration in the subsequent image is more robust than in the prior art.

The invention has been described in the context of the best mode for carrying it out. It should be understood that not all features shown in the drawings or described in the associated text may be present in an actual device, in accordance with some embodiments of the invention.

Furthermore, variations on the method and apparatus shown are included within the scope of the invention, which is limited only by the claims. For example, while the invention is described mainly with respect to optical still and movie images, the method and apparatus are also suitable for use in colorizing video and non-optically derived images, such as IR and medical images, In addition, although the Y, U, V space is used to define the color space, other formulations of color space, in which the luminance, brightness or intensity is defined separately can be used. In addition, although the invention is described in terms of each pixel being a separate element in the optimization process, the invention is also applicable to optimization in which small regions of a few pixels are used as the basic building blocks of the colorization method. Also, features of one embodiment may be provided in conjunction with features of a different embodiment of the invention. As used herein, the terms "have", "include" and "comprise" or their conjugates mean "including but not limited to."

The invention claimed is:

1. An apparatus for colorization of images, comprising:
an image display;
a user input adapted to mark an original image displayed on the display with multiple color markings, at least some of which are in different colors, the original image without the color markings; and
a controller, which receives the user generated markings and colors at least one non-marked region of the image responsive to the marked colors and the intensity of the original image, the at least one non-marked region of the image between two or more spaced apart markings of different colors is colored by mixing the different colors, the extent of said mixing dependent on differences between the intensity of a pixel located within the at least one non-marked region of the original image, and a function of intensity of neighboring pixels of the original image, the neighboring pixels located within a predefined computational window around the pixel.

2. The apparatus according to claim 1 wherein the displayed image is a black and white image containing objects and wherein the controller colorizes the entire image, based on the markings, even when some objects are not marked.

3. The apparatus according to claim 1 wherein the extent of said mixing is dependent on a scalar factor of differences of the intensity thereat and at nearby pixels in the image.

4. The apparatus according to claim 1 wherein the controller generates a cost for each small region of the image, said cost being based on a difference between a color to be assigned to the small region and the color of neighboring pixels and a difference between the intensity of the small region and the neighboring pixels.

5. The apparatus according to claim 4 wherein the small regions consist of single pixels.

6. The apparatus according to claim 4 wherein the controller finds a minimum cost for each of the small regions of the image and colors the image with colors according to said minimum cost.

7. The apparatus according to claim 6 wherein the minimum cost is a global minimum cost considering all of the pixels being colored.

8. The apparatus according to claim 5 wherein the generated cost increases with increasing color difference between nearby pixels.

9. The apparatus according to claim 6 wherein the generated cost decreases with increasing intensity difference between neighboring pixels.

10. The apparatus according to claim 7 wherein the generated cost decreases with increasing intensity difference between neighboring pixels.

11. The apparatus according to claim 1 wherein the intensity of the pixels in the image is substantially preserved during the colorization.

12. The apparatus according to claim 4 wherein the intensity of pixels in the image is preserved during the colorization.

13. The apparatus according to claim 1 wherein when a plurality of different color markings are marked on a same object, the colors between the markings are blended between said colors.

14. The apparatus according to claim 4 wherein when a plurality of different color markings are marked on a same object, the colors between the markings are blended between said colors.

15. The apparatus according to claim 5 wherein when a plurality of different color markings are marked on a same object, the colors between the markings are blended between said colors.

16. An apparatus for changing colorization of colored images, comprising:
an image display;
a user input adapted to mark an original image displayed on the display with multiple color markings, at least some of which are in different colors, the original image without the color markings; and
a controller, which receives the user generated markings and colors at least one non-marked region of the image responsive to the marked colors and the colors of the original image, the at least one non-marked region of the image between two or more spaced apart markings of different colors is colored by mixing the different colors, the extent of said mixing dependent on a scalar factor that represents the differences at pixels of the at least one non-marked region of the original image and the color of neighboring pixels located within a predefined computational window around the pixels of the at least one non-marked region.

17. The apparatus according to claim 16 wherein the color markings are used to designate areas for which the color is to be preserved and areas that are to be decolorized and wherein coloring of the image is responsive to the colors under the markings for the preserved indication and no color for portions of the image having the no color markings.

18. The apparatus according to claim 16 wherein the controller generates a cost for each small region of the image, said cost being based on a difference between a color to be assigned to the small region and the color of neighboring pixels and a difference between the original color of the small region and the neighboring pixels.

19. The apparatus according to claim 18 wherein the small regions consist of single pixels.

20. The apparatus according to claim 18 wherein the controller finds a minimum cost for each of the small regions of the image and colors the image with colors according to said minimum cost.

21. The apparatus according to claim 18 wherein the generated cost increases with increasing color difference between nearby pixels.

22. The apparatus according to claim 18 wherein the generated cost decreases with increasing intensity difference between neighboring pixels.

23. A computerized method for colorization of images, comprising:
obtaining a digital image marked with multiple color markings, at least some of which are in different colors, the digital image based on an original image without the color markings;
automatically coloring at least one non-marked region of the digital image responsive to the marked colors and the intensity of the image, the at least one non-marked region of the image between two or more spaced apart markings of different colors is colored by mixing the different colors, the extent of said mixing dependent on differences of a function of intensity at pixels of the at least one non-marked region and at neighboring pixels located within a predefined computational window around the pixels of the at least one non-marked region.

24. The method according to claim 23 wherein the extent of said mixing is dependent on a scalar factor of differences of the intensity thereat and at nearby pixels in the image.

25. A computerized method for colorization of images, comprising:
obtaining a digital image marked with multiple color markings, at least some of which are in different colors the digital image based on an original image without the color markings;
automatically assigning a cost to each pixel responsive to the difference between the color to be assigned to that pixel of at least one non-marked region and neighboring pixels located within a predefined computational window around that pixel and the difference in intensity between that pixel and neighboring pixels within the computational window;
computing the minimized cost without constraining the assigned colors to match the color markings, except at the markings themselves;
automatically coloring the at least one non-marked region of the image responsive to the marked colors and the computed cost, the at least one non-marked region of the image between two or more spaced apart markings of different colors is colored by mixing the different colors, the extent of said mixing dependent on the computed cost; and
at least one of storing, displaying, and transferring, the colorized image.

26. A computerized method for colorization of images, comprising:
obtaining a digital image marked with multiple color markings, at least some of which are in different colors, the digital image based on an original image without the color markings;
automatically changing, by a computer, the colors responsive to said markings wherein at least some of the pixels in at least one non-marked region of the original image are assigned a new color, different from its original color, that is different from the color of any of said markings in regions of low or zero intensity gradient;
wherein at least one non-marked region of the image between two or more spaced apart markings of different colors is colored with the new color; and
at least one of storing, displaying, and transferring, the colorized image.

27. The method according to claim 26 wherein said color different from the color of any of the markings is a blend of the colors of the marking.

28. A computerized method for colorizing of images, comprising;
provide a digital image having a plurality of objects having similar intensities and including two non-marked regions separated by at least one gap;
digitally marking fewer than all of the objects with a marking having a first color and digitally marking an area continuous with said gap with a second marking having a second color;
automatically coloring at least one of the unmarked and separate objects with the first color, responsive to the size of the gap and the differences of intensities between the two non-marked regions and the gap; and
at least one of storing, displaying, and transferring, the colorized image.

29. A computerized method for colorizing a series of images having objects that move within the image and comprising:
digitally marking regions within a first digital image with color markings at first positions;
automatically determining a position transformation of pixels of the first digital image in another digital image;
automatically determining a neighborhood of each pixel comprising nearby pixels located within a predefined computation window around the respective pixel of the at least one non-marked region, said neighborhood comprising pixels surrounding the pixel in the image in which is it situated and pixel and pixels at and surrounding said transformed position in the other at least one non-marked region of said first and another images;
automatically assigning a cost to each pixel in both images responsive to the difference between the color to be assigned to that pixel of the at least one non-marked region and pixels in said neighborhood;
computing the minimized cost for both images together without constraining the assigned colors between the different colored markings to match the color markings, except at the markings themselves;
automatically coloring the first and other images based on the determined minimum cost;
wherein at least one non-marked region of the image between two or more spaced apart markings of different colors is colored by mixing the different colors, the extent of said mixing dependent on the computed cost; and
at least one of storing, displaying, and transferring, the colorized image.

30. The method of colorizing according to claim 29 wherein automatically coloring comprises coloring the image responsive to the marked colors and the intensity of the image, such that colors from various markings are mixed in at least some regions of the image, the extent of said mixing dependent on differences of the intensity thereat and at nearby pixels in the image.

31. The method according to claim 29 wherein the minimum cost is a global minimum cost considering all of the pixels being colored.

32. A computerized method for colorization of images, comprising:
digitally marking a digital image with multiple color markings, at least some of which are in different colors;
automatically assigning a cost to each pixel responsive to the difference between the color to be assigned to that pixel of at least one non-marked region and neighboring pixels located within a predefined computational window around that pixel and the difference in intensity between that pixel of the at least one non-marked region and neighboring pixel located within the computational window;
minimizing the cost without constraining the assigned colors to match the color markings, except at the markings themselves;
automatically coloring at least one non-marked region of the image responsive to the marked colors and the computed cost, at least one non-marked region of the image between two or more spaced apart markings of different colors is colored by mixing the different colors, the extent of said mixing dependent on the computed cost; and
at least one of storing, displaying, and transferring, the colorized image.

33. The method according to claim 23 wherein marking comprises marking by a user.

34. The method according to claim 23 wherein the method does not attempt to have the assigned colors equal or proportional to the gradient of the intensity or original colors.

35. The apparatus according to claim 1, wherein the controller colors all of the pixels of the image outside of the markings, wherein the intensity of the pixels in the image is preserved during the colorization.

36. The apparatus according to claim 1, wherein the image is not segmented into the non-marked regions.

37. The apparatus according to claim 1, wherein the controller colors regions without discernable boundaries.

38. The apparatus according to claim 1, wherein the mixing is calculated using a non-homogenous operator.

39. The apparatus according to claim 1, wherein the marking are located within regions to be colorized.

40. The apparatus according to claim 1, wherein the image is a single image.

41. The apparatus according to claim 29, wherein optical flow defines the neighborhood of each pixel, and color propagation is performed across time by the mixing.

42. The apparatus according to claim 1, wherein the function is based on a squared difference between intensities the pixel and adjacent pixels, or based on a normalized correlation between intensities of the pixel and the adjacent pixels.

43. The apparatus according to claim 1, wherein the size of the window is selected based on a desired smoothness or edge effect.

44. The apparatus according to claim 1, wherein the size of the window is 3×3 pixels or 5×5 pixels.

* * * * *